Jan. 29, 1952  A. B. SCHREIBER  2,583,600
FEED GRINDING AND DIE EXPRESSING MACHINE
Filed Sept. 23, 1948  3 Sheets-Sheet 1

Inventor,
Allen B. Schreiber,
By
Albert E. Dieterich,
ATTORNEY.

Jan. 29, 1952  A. B. SCHREIBER  2,583,600
FEED GRINDING AND DIE EXPRESSING MACHINE
Filed Sept. 23, 1948  3 Sheets-Sheet 3

Inventor,
Allen B. Schreiber,
By Albert E. Dieterich,
ATTORNEY.

Patented Jan. 29, 1952

2,583,600

UNITED STATES PATENT OFFICE 2,583,600

FEED GRINDING AND DIE EXPRESSING MACHINE

Allen B. Schreiber, St. Joseph, Mo.; Hazle V. Schreiber executrix of Allen B. Schreiber, Sr., deceased Application September 23, 1948, Serial No. 50,787

9 Claims. (Cl. 107—14)

My invention has for its objects to provide:

1. A food grinder which is especially adapted for grinding sticky food compositions, particularly such compositions containing as much as 50% molasses and 50% dry ingredients.

2. A food grinder of the type wherein an auger or feed worm expresses the material through a die-plate, which by my invention is provided with a rotatable blade adjacent the die-plate for shearing the material, which blade rotates against the inner face of the die-plate and is so formed as to keep the food mixture from, in the main, being forced to the outer edges while still allowing enough food mixture to supply the outer ring of holes of the die-plate.

3. A food grinder whose die and die scraper are provided with means to keep the food mixture from being forced into the bearings for the auger journal.

4. A food grinder whose cylinder has a removable liner that is provided with spiral ribs and grooves for cooperation with the auger in its mixing and grinding action.

5. To provide a removable center for the die-plate so that as the parts wear down the worn center can be removed and a new one substituted, the removable center having provision to cooperate with provisions on the cutter blade for effecting a seal to prevent material being forced into the shaft bearing at that place.

6. To construct the die-plate, the distant auger shaft bearing and the removable center so as to be assembled as a unit before clamping the die-plate in the casing of the machine.

7. To provide a die-plate whose extrusion apertures are disposed in spiral rows about the axis of the plate so as to give the greatest possible number of apertures in a plate of a given diameter.

8. To provide the liner with a recessed end adjacent the die-plate in which recess the cutter member is located, to permit the use of longer blades and so as to prevent the blades striking the edges of the spiral ribs of the liner.

9. To provide a two blade cutter whose blades lie tangential to its hub and rotate in such direction that the blades will tend to push the material toward the center and away from the periphery of the die-plate.

10. To provide a bearing and bearing housing for the auger shaft which is removable with the die and can be used over and over again.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawings, in which:

Fig. 5 is an elevation of the cutter looking at the face which lies against the die-plate.

Fig. 6 is an elevation of the removable center member looking at its inner face.

Figure 1:
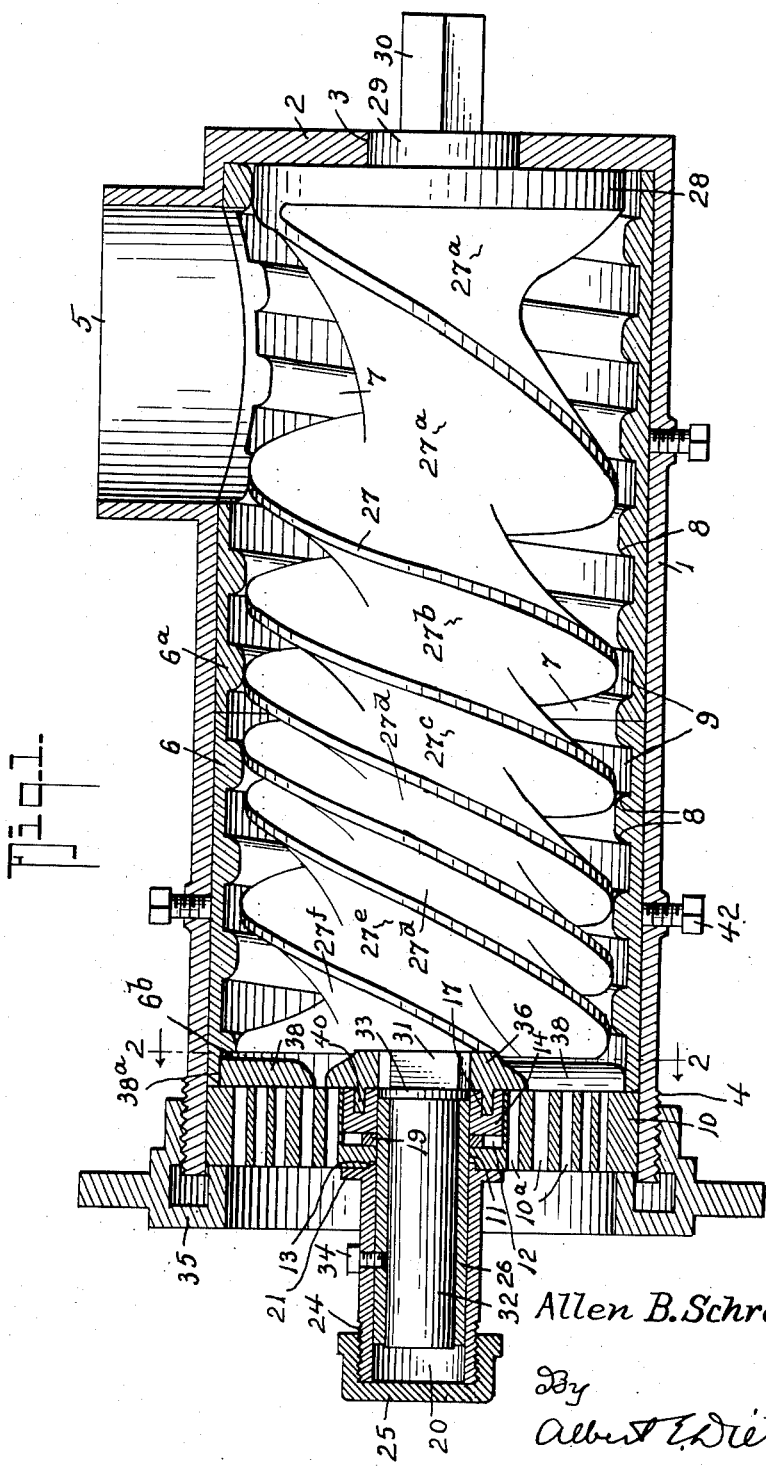
Fig. 1 is a central vertical longitudinal section on the line 1—1 of Fig. 2.
Figure 2:
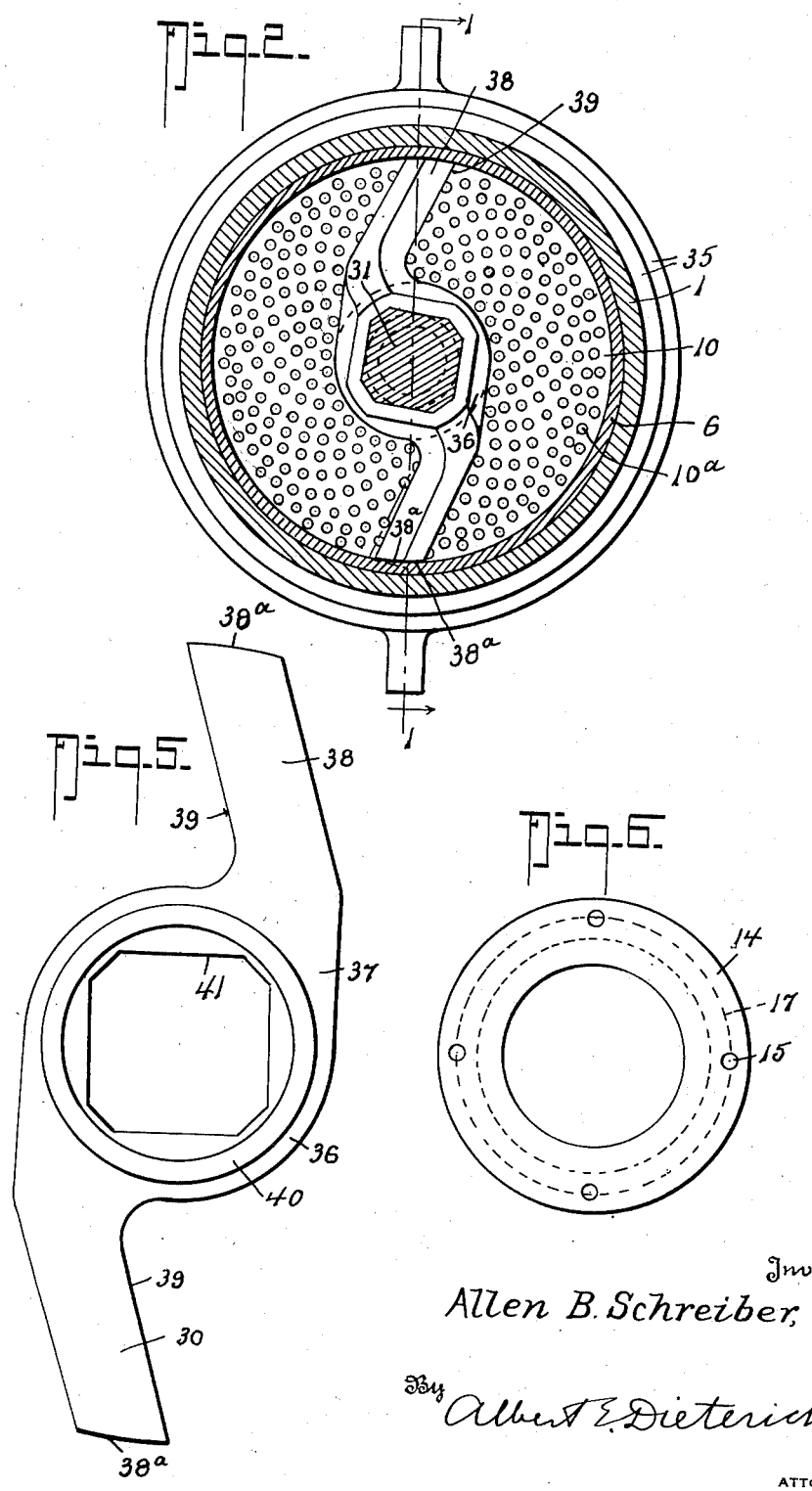
Fig. 2 is a cross section of the line 2—2 of Fig. 1.

In the accompanying drawings, in which like numerals and letters of reference indicate like parts in all figures, 1 represents a cylinder having an end wall 2 and a throat 5 adjacent the walled end. The wall 2 has a bearing aperture 3 to receive an end bearing 29 of an auger 27. The cylinder 1 has its other end externally threaded as at 4 to receive a clamping ring 35.

Within the cylinder is a liner composed of one or more members 6, 6a having spiral ribs 7 separating grooves 9. The ribs 7 have rounded edges 8 for a purpose presently understood.

The liner 6, 6a terminates a predetermined distance from the open or outlet end of the cylinder to leave a space for the reception of a die-plate 10 of considerable thickness.

The plate 10 has a central bore 11 having a deep counter bore 12 entering from the inside face and a shallow counter bore 13 on the other face.

Snugly fitted into the counter bore 12 is a center member 14 which is provided with tapped screw holes 15 and is also provided with a bore 18 and an annular groove 17. A spacing ring 19 is also located in the counter bore 12 and is of a thickness such as to keep the exposed face of the center member 14 flush with the corresponding face of the die-plate 10.

Figure 3:
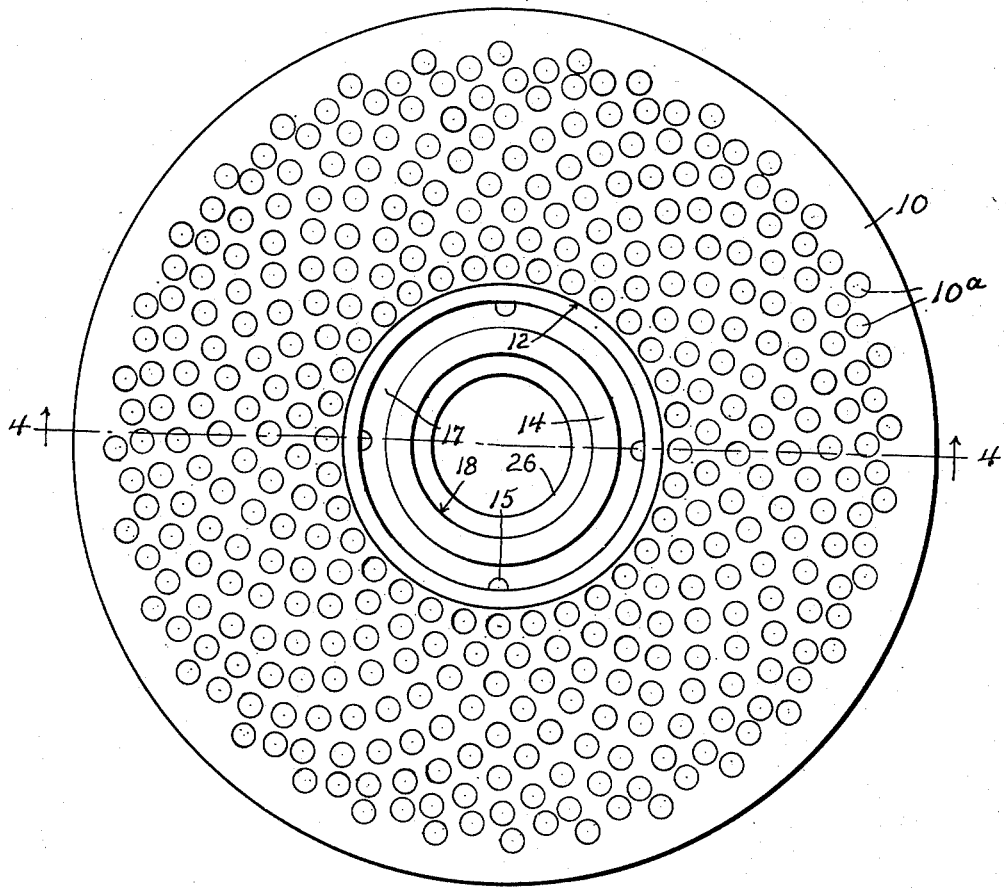
Fig. 3 is an enlarged end view of the die-plate and bearing unit.

The die-plate 10 is provided with a large number of passages 10a extending through the plate with their axes parallel to the axis of the plate. The passages 10a are disposed in equally spaced intervals along spirally disposed rows commencing adjacent the counter bore 12 and extending to a predetermined distance from the periphery of the plate as best shown in Fig. 3. The extrusion or die-plate 10 and the center insert member 14 are preferably made of hard steel, such, for example, as tool steel and while the center member is removable from the counter bore 12 it nevertheless is fitted therein with a close fit. The ring 19 may be made of a softer metal, such as brass, for example.

Figure 4:
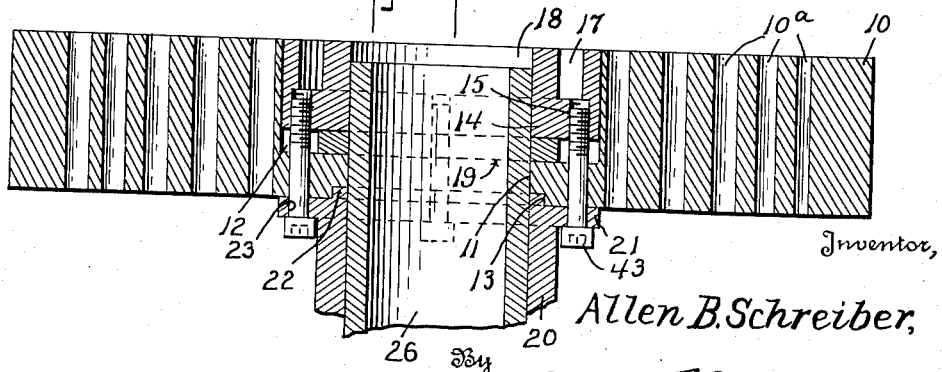
Fig. 4 is a section on the line 4—4 of Fig. 3, parts being broken away.

20 represents a bearing housing having a flange 21 and a boss 22, the boss being designed to fit snugly into the counter bore 13 of the plate 10. The flange 21 has holes 23 for the screws 43 which are used to secure the parts 21, 10, 19, 14 rigidly and tightly together, see Fig. 4. At its outer end the housing 20 is threaded, as at 24, to receive a cap 25 and within the housing 20 is tightly fitted a bearing bushing 26 (Figs. 1 and 4). Provision is made for oiling the bearing by means of an oil hole and plug 34.

The auger 27 at one end has a circular disc 28, a bearing 29 and stub shaft 30 to which shaft power may be applied to turn the auger. The auger at the entrant end of the machine has its blade separated to provide wide spaces 27ª, then the blade is shaped to provide progressively decreasing spaces 27ᵇ, 27ᶜ, 27ᵈ, there being two narrow spaces 27ᵈ, and then the spaces widen out progressively as at 27ᵉ and 27ᶠ respectively. In this way the material is gradually compacted from the entrant end of the machine toward the middle and then allowed to expand slightly before being pressed through the holes 10ª. Whatever may be the exact action of the machine on the material being passed through the machine, experience has shown that better results are obtained with the present construction than are obtained with an ordinary type of auger, either one with equally spaced turns or with turns with gradually decreasing spaces from entrant to exit end.

At the exit end the auger has a shaft 32 that fits into the bearing bushing 26 and has a collar 33 that has a running fit in the end of the center member 14 and bears against the adjacent end of the bearing bushing 26 as best shown in Fig. 1. The shaft 32 is also provided with a squared portion 31 on which is fitted the squared opening 41 in a knife that is composed of a hub 36 from which extend, tangentially, two blades 38 whose flat faces 37 lie adjacent the face of the plate 10 which is on the inside of the machine. The knife also has a ring 40 which has a close running fit in the groove 17. The blades 38 have sharpened advance edges 39 and ends 38ª which extend to the inner periphery of a recess or cutback portion 6ᵇ.

The spiral lines 6, 6ª are held from turning by set screws 42 and by tightening clamp ring 35 to press plate 10 against the adjacent end of the liner.

As intimated before, the material which this machine has been designed to handle is a viscous, sticky, gritty mass composed of about 50% thick molasses plus about 50% grain and vegetable fibers.

A machine built on a scale about two and one-half times that of Fig. 1 requires about 75 horsepower to operate. Thus it will be seen very high pressures are built up in the machine at the die-plate entrance, making impossible successfully to use the common types of bearings and seals to protect shaft 32, such seals, for example, as are shown in Fig. 5 of the patent to Morehouse No. 2,296,562 of September 22, 1942, and the use of ball bearings is out of the question.

By extending the blades to the inner periphery of the cut-back recess 6ᵇ material cannot accumulate therein but will be worked toward the center and be forced through the outer set of holes 10ª. When liners with square cut ribs were tried it was found that material sometimes gummed up in the corners and did not pass along freely but with the rounded corners the material would slip over or be easily worked over the ribs 7 by the auger.

I am aware that grinders for meat and other similar substances, using an auger in a cylinder and a relatively thin die-plate have heretofor been known, see, for example, Patent No. 2,007,104 issued July 2, 1935, to H. Zwart, but owing to the sticky, gritty, relatively hard fluent mass used in the preparation of animal feed for which my machine is used for, it would not be practical to use the Zwart machine with such material as it would soon gum up.

Such machines as the Zwart machine might work all right on dry mixtures and possibly on some moist mixtures but cannot be successfully used on the special food mixture containing such a high percentage of sticky molasses as is contained in the product sold by me under the trade name Sweet Lassy.

This application is a continuation in part of my application filed September 5, 1947, Serial No. 772,256, now abandoned. In the machine of that application when the parts 21, 10 and 27 became worn it was necessary to replace them with new parts. As the die-plate 10 and knife were made of hard steel the expense of replacement was considerable. With my present construction the die-plate need not be replaced but only the center 14 and the knife, thus saving considerable expense. The structure is such that even as the groove 17 enlarges with wear up to a replacement time collar 33 still tends to keep any harmful leakage of material from the bearing of shaft 32. Housing 20 being closed by cap 25 and plug 34 oil pocketing in the cap will act as a stop against the pressures set up in cylinder 1 when forcing the heavy sticky material through the die.

From the foregoing description, taken in connection with the accompanying drawings, it is thought that the construction, operation and advantages of the invention will readily appear to those skilled in the art.

What I claim is:

1. In a grinding and die expressing machine, a perforated die plate having a bore therethrough and an annular groove in one face thereof circumscribing the bore; a tubular bushing in said bore; a shaft rotatably mounted in said bushing and provided with an external, annular collar disposed in the bore and bearing against one end of said bushing; a bladed knife member mounted on the shaft for rotation therewith in engagement with said one face of the die plate; and an annular ring on the knife member extending into said groove for rotation therewithin.

2. In a grinding and die expressing machine, a perforated die plate having a bore therethrough and an annular groove in one face thereof circumscribing the bore; a tubular housing releasably secured to the opposite face of said die plate in register with said bore; a tubular bushing in said bore and said housing, and releasably secured to the latter; a shaft rotatably mounted in said bushing and provided with an external, annular collar disposed in the bore and bearing against one end of said bushing; a bladed knife member mounted on the shaft for rotation therewith in engagement with said one face of the die plate; and an annular ring on the knife member extending into said groove for rotation therewithin.

3. In a grinding and die expressing machine, a perforated die plate having a bore therethrough and an annular groove in one face thereof circumscribing the bore; a tubular housing releasably secured to the opposite face of said die plate in register with said bore; a tubular bushing in said bore and said housing and releasably secured to the latter; a shaft rotatably mounted in said bushing and provide with an external, annular collar disposed in the bore and bearing against one end of said bushing; a bladed knife member mounted on the shaft for rotation therewith in engagement with said one face of the die plate; and an annular ring on the knife member extending into said groove for rotation therewithin, there being a counter-bore in said opposite face of the die plate circumscribing said bore, and an external, annular boss on the housing and fitted in said counter-bore.

4. In a grinding and die expressing machine, a perforated die plate having a bore therethrough and a counter-bore circumscribing said bore; a tubular center member fitted in said counter-bore in register with said bore and provided with an annular groove concentric with said bore; a tubular bushing in said bore and said center member; a shaft rotatably mounted in said bushing and provided with an external, annular collar disposed in said center member and bearing against one end of said bushing; a bladed knife member mounted on the shaft for rotation therewith in engagement with one face of the die plate and one face of the center member; and an annular ring on the knife member extending into said groove for rotation therewithin.

5. In a grinding and die expressing machine, a perforated die plate having a bore therethrough and a counter-bore circumscribing said bore; a tubular housing in register with said bore; a tubular center member fitted in said counter-bore in register with said bore and provided with an annular groove concentric with said bore; means common to the housing and to the center member for releasably attaching the same to the die member; a tubular bushing in said bore, said center member and said housing, and releasably secured to the latter; a shaft rotatably mounted in said bushing and provided with an external, annular collar disposed in said center member and bearing against one end of said bushing; a bladed knife member mounted on the shaft for rotation therewith in engagement with one face of the die plate and one face of the center member; and an annular ring on the knife member extending into said groove for rotation therewithin.

6. In a grinding and die expressing machine as set forth in claim 5 wherein is provided a ring circumscribing said bushing within the counter-bore and said means is adapted to clamp the last-mentioned ring tightly between the center member and the die plate.

7. In a grinding and die expressing machine, a perforated die plate having a bore therethrough and a counter-bore circumscribing said bore; a tubular housing in register with said bore; a tubular center member fitted in said counter-bore in register with said bore and provided with an annular groove concentric with said bore; means common to the housing and to the center member for releasably attaching the same to the die member; a tubular bushing in said bore, said center member and said housing, and releasably secured to the latter; a shaft rotatably mounted in said bushing and provided with an external, annular collar disposed in said center member and bearing against one end of said bushing; a bladed knife member mounted on the shaft for rotation therewith in engagement with one face of the die plate and one face of the center member; and an annular ring on the knife member extending into said groove for rotation therewithin, and wherein said die plate is provided with a second counter-bore adjacent the housing, there being an external, annular boss on the housing and fitted in said second counter-bore.

8. In a grinding and die expressing machine, a perforated die plate having a bore therethrough and an annular groove in one face thereof, circumscribing the bore; a rotatable shaft in said bore; a bladed knife member mounted on the shaft for rotation therewith in engagement with said one face of the die plate; and an annular ring on the knife member extending into said groove for rotation therewithin.

9. In a grinding and die expressing machine, a perforated die plate having a bore therethrough; a tubular bushing in said bore; a shaft rotatably mounted in said bushing and provided with an external, annular collar disposed in the bore and bearing against one end of said bushing; and a bladed knife member mounted on the shaft for rotation therewith in engagement with one face of the die plate.

ALLEN B. SCHREIBER.

REFERENCES CITED

The following references are of record in the file of this patent:

UNITED STATES PATENTS

| Number | Name | Date |
| --- | --- | --- |
| 339,834 | Baker | Apr. 13, 1886 |
| 704,698 | Edison | July 15, 1902 |
| 1,402,672 | Sizer | Jan. 3, 1922 |
| 1,461,504 | Tanzi | July 10, 1923 |
| 1,772,872 | Maldari | Aug. 12, 1930 |
| 1,833,186 | Stimpson | Nov. 24, 1931 |
| 1,835,864 | Gumprich | Dec. 8, 1931 |
| 1,959,628 | Jacobson | May 22, 1934 |
| 2,144,055 | Hall | Jan. 17, 1939 |
| 2,222,614 | Gronich | Nov. 26, 1940 |
| 2,259,623 | Dieckmann | Oct. 21, 1941 |
| 2,289,264 | Hawk | Nov. 24, 1941 |
| 2,291,212 | Clinefelter | July 28, 1942 |
| 2,316,565 | Collier | Apr. 13, 1943 |
| 2,355,390 | Murphy | Aug. 8, 1944 |
| 2,445,037 | Richard | July 13, 1948 |
| 2,494,891 | Marshall | Jan. 17, 1950 |